US012651245B2

(12) United States Patent
Cheng et al.

(10) Patent No.: US 12,651,245 B2
(45) Date of Patent: Jun. 9, 2026

(54) METHOD, WALLET APPLICATION TERMINAL, AND SYSTEM FOR OPENING DIGITAL WALLET

(71) Applicant: DIGITAL CURRENCY INSTITUTE, THE PEOPLE'S BANK OF CHINA, Beijing (CN)

(72) Inventors: Zhuo Cheng, Beijing (CN); Guangyao Li, Beijing (CN); Chenyi Peng, Beijing (CN)

(73) Assignee: DIGITAL CURRENCY INSTITUTE, THE PEOPLE'S BANK OF CHINA, Beijing (CN)

( * ) Notice: Subject to any disclaimer, the term of this patent is extended or adjusted under 35 U.S.C. 154(b) by 96 days.

(21) Appl. No.: 18/696,726

(22) PCT Filed: Jul. 22, 2022

(86) PCT No.: PCT/CN2022/107330
§ 371 (c)(1),
(2) Date: Mar. 28, 2024

(87) PCT Pub. No.: WO2023/050983
PCT Pub. Date: Apr. 6, 2023

(65) Prior Publication Data
US 2025/0037113 A1 Jan. 30, 2025

(30) Foreign Application Priority Data
Sep. 29, 2021 (CN) .......................... 202111148905.X

(51) Int. Cl.
*G06Q 20/36* (2012.01)
*G06Q 20/40* (2012.01)

(52) U.S. Cl.
CPC ..... *G06Q 20/363* (2013.01); *G06Q 20/40145* (2013.01)

(58) Field of Classification Search
CPC ........... G06Q 20/363; G06Q 20/40145; G06Q 40/02; G06Q 20/3674; G06Q 20/36
See application file for complete search history.

(56) References Cited

U.S. PATENT DOCUMENTS 9,799,027 B2 * 10/2017 Pasa ..................... G06Q 20/363
11,195,169 B1 * 12/2021 Hartman .............. G06Q 20/326
(Continued)

FOREIGN PATENT DOCUMENTS

CA 3045831 A1 12/2019
CA 3095271 A1 * 4/2022 ......... G06Q 20/3674
(Continued)

OTHER PUBLICATIONS

First Look: China's Central Bank Digital Currency (Year: 2019).*
(Continued)

*Primary Examiner* — James H Miller
(74) *Attorney, Agent, or Firm* — The Sun IP Law

(57) ABSTRACT

The present disclosure provides a method for opening a digital wallet, a wallet application terminal, and a system. The method comprises: acquiring, from a digital currency issuer agency server, a list of operating agency servers that can open a digital wallet and displaying the list of operating agency servers, so that a user selects a target operating agency server from the list of operating agency servers; communicating with the target operating agency server, so that the target operating agency server verifies the user; when the verification is passed, sending a digital wallet opening request to the digital currency issuer agency server, so that the digital currency issuer agency server notifies the target operating agency server to perform a digital wallet opening operation, or sending a digital wallet opening (Continued)

request to the target operating agency server, so that the target operating agency server performs a digital wallet opening operation.

20 Claims, 4 Drawing Sheets

(56)                    References Cited

U.S. PATENT DOCUMENTS

| | | | | |
|---|---|---|---|---|
| 2013/0191227 | A1* | 7/2013 | Pasa | G06Q 20/027 |
| | | | | 705/41 |
| 2014/0324690 | A1* | 10/2014 | Allen | H04M 3/5183 |
| | | | | 705/41 |
| 2016/0162882 | A1* | 6/2016 | McClung, III | G06Q 20/352 |
| | | | | 705/41 |
| 2016/0335628 | A1* | 11/2016 | Weigold | G06Q 20/065 |
| 2017/0046688 | A1* | 2/2017 | Pande | G06Q 20/3278 |
| 2017/0053268 | A1* | 2/2017 | Pande | G06Q 30/0259 |
| 2017/0278096 | A1* | 9/2017 | Chitalia | G06Q 20/20 |
| 2019/0378120 | A1* | 12/2019 | Berrod | G06Q 20/3821 |
| 2020/0286076 | A1* | 9/2020 | Zhu | H04L 63/0884 |
| 2020/0320501 | A1* | 10/2020 | Ready | G06Q 30/0641 |
| 2021/0304193 | A1* | 9/2021 | Cadet | G06Q 20/4014 |
| 2022/0108304 | A1* | 4/2022 | Glynn-Udrow | H04L 63/0861 |
| 2022/0261784 | A1* | 8/2022 | Aravamudhan | G06Q 20/227 |

FOREIGN PATENT DOCUMENTS

| | | | | | |
|---|---|---|---|---|---|
| CN | 1420433 | A | 5/2003 | | |
| CN | 108022104 | A | 5/2018 | | |
| CN | 108229938 | A | 6/2018 | | |
| CN | 108885747 | A | 11/2018 | | |
| CN | 110494878 | A | 11/2019 | | |
| CN | 110852729 | A | * | 2/2020 | G06Q 20/3674 |
| CN | 112449350 | A | | 3/2021 | |
| CN | 108229938 | B | * | 6/2021 | H04L 9/3263 |
| WO | 2017034480 | A1 | | 3/2017 | |
| WO | WO-2022020523 | A1 | * | 1/2022 | H04L 9/50 |

OTHER PUBLICATIONS

Permission Blockchain Network based Central Bank Digital Currency (Year: 2021).*
Are Central Bank Digital Currencies (CBDCs) the money of tomorrow? (Year: 2020).*
BIS Papers No. 101 Proceeding with caution—a survey on central bank (Year: 2019).*
Central bank digital currency (part 1): Objectives and architectural (Year: 2021).*
Central bank digital currency (part 2): Technology options and performance (Year: 2021).*
The Development of Central Bank Digital Currency in China: An Analysis (Year: 2021).*
The first office action of counterpart CN application No. 202111148905.X issued on Jun. 4, 2025.
Yu Jichao, Detailed Explanation of Digital RMB Wallets of 7 Operating Institutions with No Limit for Strong Real-name Wallets, May 12, 2021.
The first office action of counterpart EP application No. 22874380.3 issued on Nov. 18, 2024.

* cited by examiner

500

503

502

504

505

501

600

CPU ⌐601    ROM ⌐602    RAM ⌐603

⌐604

I/O interface ⌐605

Input portion ⌐606   Output portion ⌐607   Storage portion ⌐608   Communication portion ⌐609   Driver ⌐610

Removable medium ⌐611

1

METHOD, WALLET APPLICATION TERMINAL, AND SYSTEM FOR OPENING DIGITAL WALLET

CROSS-REFERENCE TO RELATED APPLICATION

The present application claims priority to Chinese Patent Application No. 202111148905.X, filed on Sep. 29, 2021 and entitled "Method, Apparatus and System for Opening Digital Wallet", and the content disclosed by the Chinese patent application is incorporated herein by reference as part of the present application.

TECHNICAL FIELD

The present disclosure relates to the field of computer technologies, and in particular, to a method, a wallet application terminal, and a system for opening a digital wallet.

BACKGROUND

The digital currency adopts a dual-layer operation architecture mode in which the issuing is performed by an issuer agency and operation is performed by an operation agency server authorized by the issuer agency. At present, when a digital wallet is opened, a user needs to open the digital wallet in a digital wallet opening mode provided by an authorized operating agency server (for example, downloading an app of a specific operating agency server, going to an offline store of the authorized operating agency server, etc.). Such a digital wallet opening method is inconvenient, and cannot open a digital wallet of another authorized operating agency server on one authorized operating agency server platform.

SUMMARY

According to an aspect of an embodiment of the present disclosure, provided is a method for opening a digital wallet, comprising:

acquiring, from a digital currency issuer agency server, a list of operating agency servers that can open a digital wallet and displaying the list of operating agency servers, so that a user selects a target operating agency server from the list of operating agency servers;

communicating with the target operating agency server, so that the target operating agency server verifies the user;

if verification is passed, sending a digital wallet opening request to the digital currency issuer agency server, so that the digital currency issuer agency server notifies the target operating agency server to perform a digital wallet opening operation and return a digital wallet opening result, or sending a digital wallet opening request to the target operating agency server to cause the target operating agency server to perform a digital wallet opening operation and return a digital wallet opening result to the digital currency issuer agency server; and receiving a digital wallet opening result returned by the digital currency issuer agency server after a digital wallet is opened.

In some embodiments of the present disclosure, before communicating with the target operating agency server, the method further comprises: receiving a digital wallet level operation request of the user, and parsing a digital wallet level from the digital wallet level operation request;

communicating with the target operating agency server further comprises: sending the digital wallet level to the target operating agency server, so that the target operating agency server determines, according to the digital wallet level, a verification content for verifying the user;

the method further comprises generating the digital wallet opening request on the basis of the verification content that passes verification.

In some embodiments of the present disclosure, the verification content comprises a verification code; communicating with the target operating agency server, so that the target operating agency server verifies the user comprises:

sending to the target operating agency server a request for acquiring a verification code, and receiving a verification code returned by the target operating agency server in response to the request for acquiring a verification code; and sending to the target operating agency server a request for verifying a verification code, so that the target operating agency server verifies the user on the basis of the verification code, and receiving a verification result returned by the target operating agency server.

In some embodiments of the present disclosure, the verification content comprises digital wallet information; communicating with the target operating agency server, so that the target operating agency server verifies the user comprises:

receiving digital wallet information input by the user, and sending the digital wallet information to the target operating agency server, so that the target operating agency server verifies the user on the basis of the digital wallet information, and receiving a verification result returned by the target operating agency server.

In some embodiments of the present disclosure, the digital wallet information comprises digital wallet real-name information and digital wallet user's biometric information; communicating with the target operating agency server, so that the target operating agency server verifies the user comprises:

receiving digital wallet real-name information input by the user, and sending the digital wallet real-name information to the target operating agency server, so that the target operating agency server verifies the user on the basis of the digital wallet real-name information, and receiving a verification result returned by the target operating agency server;

receiving biometric information input by the user, and sending the biometric information to the target operating agency server, so that the target operating agency server verifies the user on the basis of the biometric information, and receiving a verification result returned by the target operating agency server.

In some embodiments of the present disclosure, the verification content comprises bank account information; communicating with the target operating agency server, so that the target operating agency server verifies the user comprises:

receiving bank account information input by the user, and sending the bank account information to the target operating agency server, so that the target operating agency server verifies the user on the basis of the bank account information, and receiving a verification result returned by the target operating agency server.

In some embodiments of the present disclosure, the bank account information comprises bank card number information and a mobile phone number bound to a bank card;

communicating with the target operating agency server, so that the target operating agency server verifies the user comprises:

receiving bank card number information input by the user, and sending the bank card number information to the target operating agency server, so that the target operating agency server verifies the user on the basis of the bank card number information, and receiving a verification result returned by the target operating agency server;

verifying, according to the bank card number information, whether a bank card input by the user is a bank card of an authorized authority;

receiving a mobile phone number bound to a bank card input by the user, and sending to the target operating agency server a request for acquiring a verification code, so that the target operating agency server queries an issuer bank of the bank card for the verification code, and receiving the verification code returned by the target operating agency server; and receiving a mobile phone number bound to a bank card and input by the user, and sending to the target operating agency server a request for verifying the verification code, so that the target operating agency server queries the issuer bank of the bank card for the verification code, and receiving the verification code returned by the target operating agency server.

In some embodiments of the present disclosure, before sending the digital wallet opening request to the target operating agency server or the digital currency issuer agency server, the method further comprises:

receiving a digital wallet identifier operation request of the user, and parsing a digital wallet identifier from the digital wallet identifier operation request; and receiving a payment password operation request from the user, and parsing a payment password of digital wallet from the payment password operation request.

In some embodiments of the present disclosure, after receiving the digital wallet opening result returned by the target operating agency server, the digital currency issuer agency server stores relevant information of an opened digital wallet, the relevant information comprising at least one of the following: a digital wallet name, a digital wallet ID and a bound mobile phone number.

According to a second aspect of an embodiment of the present disclosure, provided is a wallet application terminal comprising:

an information acquisition component configured to acquire, from a digital currency issuer agency server, a list of operating agency servers that can open a digital wallet and displaying the list of operating agency servers, so that a user selects a target operating agency server from the list of operating agency servers;

an information verification component configured to communicate with the target operating agency server, so that the target operating agency server verifies the user; and a wallet opening component configured to send, if the verification is passed, a digital wallet opening request to the digital currency issuer agency server, so that the digital currency issuer agency server notifies the target operating agency server to perform a digital wallet opening operation and return a digital wallet opening result, or send a digital wallet opening request to the target operating agency server to cause the target operating agency server to perform a digital wallet opening operation and return a digital wallet opening result to the digital currency issuer agency server; and receive a digital wallet opening result returned by the digital currency issuer agency server after a digital wallet is opened.

In some embodiments of the present disclosure, the information acquisition component is further configured to receive, before communicating with the target operating agency server, a digital wallet level operation request of the user, and parse a digital wallet level from the digital wallet level operation request;

the information verification component is further configured to: send the digital wallet level to the target operating agency server, so that the target operating agency server determines, according to the digital wallet level, a verification content for verifying the user;

the digital wallet opening component is further to generate the digital wallet opening request on the basis of the verification content that passes verification.

In some embodiments of the present disclosure, the verification content comprises a verification code; the information verification component communicating with the target operating agency server, so that the target operating agency server verifies the user comprises:

sending to the target operating agency server a request for acquiring a verification code, and receiving a verification code returned by the target operating agency server in response to the request for acquiring a verification code; and sending to the target operating agency server a request for verifying a verification code, so that the target operating agency server verifies the user on the basis of the verification code, and receiving a verification result returned by the target operating agency server.

In some embodiments of the present disclosure, the verification content comprises digital wallet information; the information verification component communicating with the target operating agency server, so that the target operating agency server verifies the user comprises:

receiving digital wallet information input by the user, and sending the digital wallet information to the target operating agency server, so that the target operating agency server verifies the user on the basis of the digital wallet information, and receiving a verification result returned by the target operating agency server.

In some embodiments of the present disclosure, the digital wallet information comprises digital wallet real-name information and digital wallet user's biometric information; the information verification component communicating with the target operating agency server, so that the target operating agency server verifies the user comprises:

receiving digital wallet real-name information input by the user, and sending the digital wallet real-name information to the target operating agency server, so that the target operating agency server verifies the user on the basis of the digital wallet real-name information, and receiving a verification result returned by the target operating agency server;

receiving biometric information input by the user, and sending the biometric information to the target operating agency server, so that the target operating agency server verifies the user on the basis of the biometric information, and receiving a verification result returned by the target operating agency server.

In some embodiments of the present disclosure, the verification content comprises bank account information; the information verification component communicating with the target operating agency server, so that the target operating agency server verifies the user comprises:

receiving bank account information input by the user, and sending the bank account information to the target operating agency server, so that the target operating agency server verifies the user on the basis of the bank account information, and receiving a verification result returned by the target operating agency server.

In some embodiments of the present disclosure, the bank account information comprises bank card number information and a mobile phone number bound to a bank card; the information verification component communicating with the target operating agency server, so that the target operating agency server verifies the user comprises:

receiving bank card number information input by the user, and sending the bank card number information to the target operating agency server, so that the target operating agency server verifies the user on the basis of the bank card number information, and receiving a verification result returned by the target operating agency server;

verifying, according to the bank card number information, whether a bank card input by the user is a bank card of an authorized authority;

receiving a mobile phone number bound to a bank card input by the user, and sending to the target operating agency server a request for acquiring a verification code, so that the target operating agency server queries an issuer bank of the bank card for the verification code, and receiving the verification code returned by the target operating agency server; and receiving a mobile phone number bound to a bank card and input by the user, and sending to the target operating agency server a request for verifying the verification code, so that the target operating agency server queries the issuer bank of the bank card for the verification code, and receiving the verification code returned by the target operating agency server.

In some embodiments of the present disclosure, before the wallet opening component sends the digital wallet opening request to the target operating agency server or the digital currency issuer agency server, the information verification component is further configured to:

receive a digital wallet identifier operation request of the user, and parse a digital wallet identifier from the digital wallet identifier operation request; and receive a payment password operation request from the user, and parse a payment password of digital wallet from the payment password operation request.

In some embodiments of the present disclosure, after receiving the digital wallet opening result returned by the target operating agency server, the digital currency issuer agency server stores relevant information of an opened digital wallet, the relevant information comprising at least one of the following: a digital wallet name, a digital wallet ID and a bound mobile phone number.

According to a third aspect of an embodiment of the present disclosure, provided is a system for opening a digital wallet, comprising: a wallet application terminal, a target operating agency server and a digital currency issuer agency server; wherein, the wallet application terminal sends, to the digital currency issuer agency server, a request for querying a list of operating agency servers that can open a digital wallet; the digital currency issuer agency server returns the list of operating agency servers to the wallet application terminal;

the wallet application terminal displays the list of operating agency servers to a user, so that the user selects the target operating agency server from the list of operating agency servers;

the wallet application terminal communicates with the target operating agency server, and the target operating agency server verifies the user, and returns a verification result to the wallet application terminal;

if the verification is passed, the wallet application terminal sends a digital wallet opening request to the digital currency issuer agency server, the digital currency issuer agency server notifies the target operating agency server to execute a digital wallet opening operation in response to the digital wallet opening request, the target operating agency server executes a digital wallet opening operation and then returns a digital wallet opening result to the digital currency issuer agency server, and the digital currency issuer agency server returns the digital wallet opening result to the wallet application terminal; or, the wallet application terminal sends a digital wallet opening request to the target operating agency server, the target operating agency server executes a digital wallet opening operation in response to the digital wallet opening request, and returns a digital wallet opening result to the digital currency issuer agency server; and the digital currency issuer agency server returns the digital wallet opening result to the wallet application terminal.

In some embodiments of the present disclosure, the wallet application terminal is further configured to:

before communicating with the target operating agency, receive a digital wallet level operation request of the user, and parse a digital wallet level from the digital wallet level operation request;

send the digital wallet level to the target operating agency server, so that the target operating agency server determines, according to the digital wallet level, a verification content for verifying the user;

generate the digital wallet opening request on the basis of the verification content that passes verification.

In some embodiments of the present disclosure, the verification content comprises a verification code; the wallet application terminal sends to the target operating agency server a request for acquiring a verification code, and the target operating agency server returns the verification code to the wallet application terminal in response to the request for acquiring a verification code;

the wallet application terminal sends to the target operating agency server a request for verifying a verification code, the target operating agency server verifies the user on the basis of the verification code, and then returns a verification result to the wallet application terminal.

In some embodiments of the present disclosure, the verification content comprises digital wallet information; the wallet application terminal receives the digital wallet information input by the user and sends the digital wallet information to the target operating agency server; the target operating agency server verifies the user on the basis of the digital wallet information, and then returns a verification result to the wallet application terminal.

In some embodiments of the present disclosure, the digital wallet information comprises digital wallet real-name information and digital wallet user's biometric information; the wallet application terminal receives the digital wallet real-name information input by the user and sends the digital wallet real-name information to the target operating agency server; the target operating agency server verifies the user on the basis of the digital wallet real-name information, and then returns a verification result to the wallet application terminal;

the wallet application terminal receives the biological feature input by the user and sends the biological feature to the target operating agency server; the target operating agency server verifies the user on the basis of the biological information, and then returns a verification result to the wallet application terminal.

In some embodiments of the present disclosure, the verification content comprises bank account information; the wallet application terminal receives the bank account information input by the user and sends the bank account information to the target operating agency server; the target operating agency server verifies the user on the basis of the bank account information, and then returns a verification result to the wallet application terminal.

In some embodiments of the present disclosure, the bank account information comprises bank card number information and a mobile phone number bound to a bank card; the wallet application terminal receives bank card number information input by the user and sends the bank card number information to the target operating agency server; the target operating agency server verifies the user on the basis of the bank card number information, and then returns a verification result to the wallet application terminal.

the wallet application terminal verifies, according to the bank card number information, whether a bank card input by the user is a bank card of an authorized authority;

the wallet application terminal receives a mobile phone number bound to a bank card input by the user, and sends to the target operating agency server a request for acquiring a verification code;

the target operating agency server queries an issuer bank of the bank card for the verification code, and returns the verification code to the wallet application terminal; the wallet application terminal sends to the target operating agency server a request for verifying the verification code, and the target operating agency server queries the issuer bank for the verification code, and then returns a verification result to the wallet application terminal.

In some embodiments of the present disclosure, the wallet application terminal is further configured to:

before the wallet opening component sends the digital wallet opening request to the target operating agency server or the digital currency issuer agency server, receive a digital wallet identifier operation request of the user, and parse a digital wallet identifier from the digital wallet identifier operation request; and receive a payment password operation request from the user, and parse a payment password of digital wallet from the payment password operation request.

In some embodiments of the present disclosure, after receiving the digital wallet opening result returned by the target operating agency server, the digital currency issuer agency server stores relevant information of an opened digital wallet, the relevant information comprising at least one of the following: a digital wallet name, a digital wallet ID and a bound mobile phone number.

According to a fourth aspect of the embodiments of the present disclosure, provided is an electronic device for opening a digital wallet, comprising:

one or more processors;

a storage device for storing one or more programs, when the one or more programs are executed by the one or more processors, the one or more processors implement the method provided by the first aspect of the embodiments of the present disclosure.

According to a fifth aspect of the embodiments of the present disclosure, provided is a computer readable medium, on which a computer program is stored, wherein the program, when executed by a processor, implements the method provided by the first aspect of the embodiments of the present disclosure.

Further effects of the described non-conventional optional modes will be described hereinafter in conjunction with the embodiments.

BRIEF DESCRIPTION OF THE DRAWINGS

The accompanying drawings are used to better understand the present disclosure, and do not constitute limitations to the present disclosure; wherein.

DETAILED DESCRIPTION OF THE EMBODIMENTS

Hereinafter, exemplary embodiments of the present disclosure are illustrated with reference to the accompanying drawings, in which various details of the embodiments of the present disclosure are included to facilitate understanding, and they shall be considered as merely exemplary. Accordingly, a person of ordinary skill in the art would recognize that various changes and modifications of the embodiments described herein can be made without departing from the scope and spirit of the present disclosure. Also, for clarity and conciseness, illustrations of well-known functions and structures are omitted in the following description.

According to a first aspect of an embodiment of the present disclosure, a method for opening a digital wallet is provided.

Figure 1:
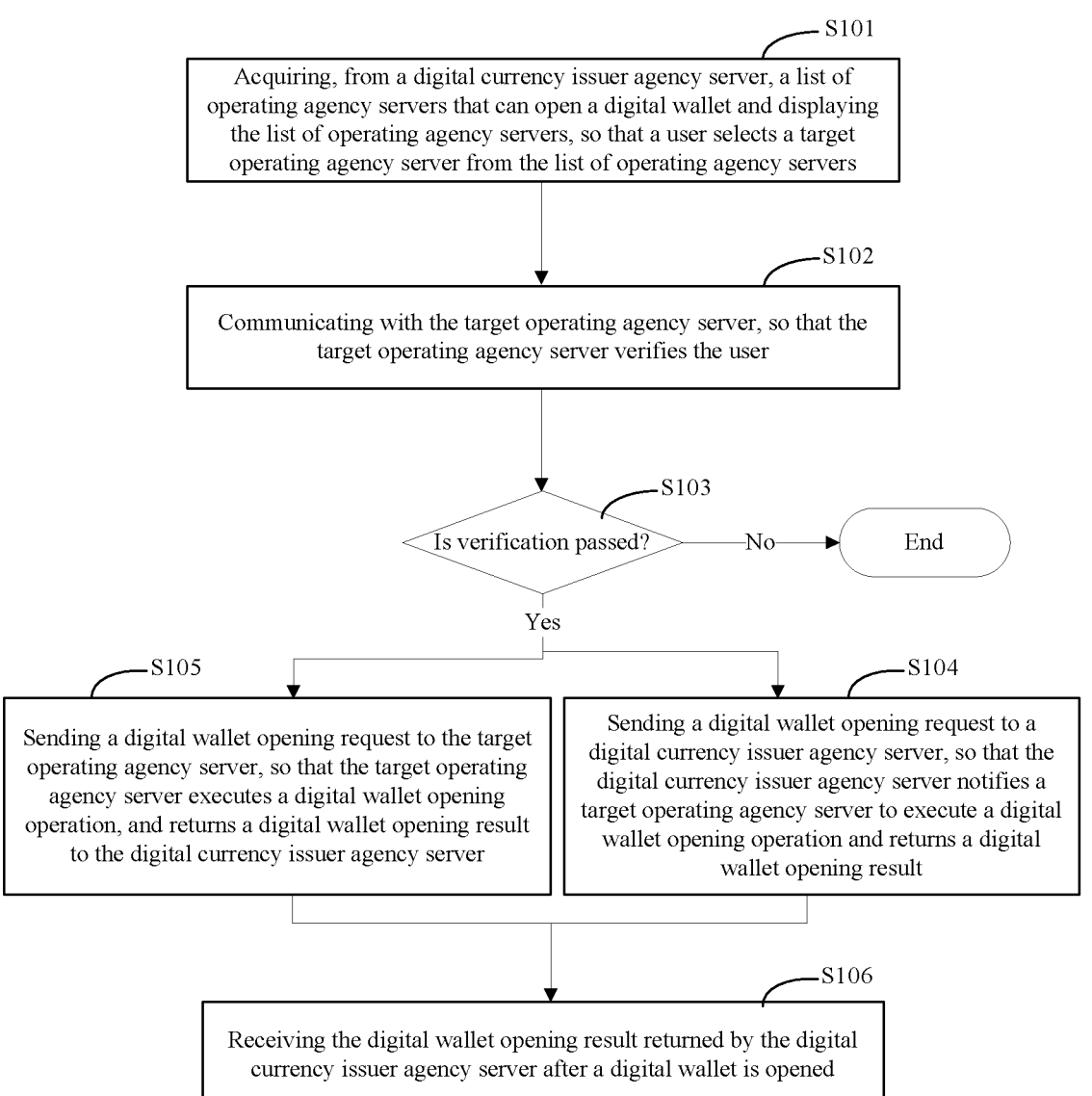
FIG. 1 is a schematic diagram of a main flow of a method for opening a digital wallet according to an embodiment of the present disclosure.

FIG. 1 is a schematic diagram of a main flow of a method for opening a digital wallet according to an embodiment of the present disclosure. As shown in FIG. 1, the method for opening a digital wallet according to an embodiment of the present disclosure comprises:

step S101, acquiring, from a digital currency issuer agency server, a list of operating agency servers that can open a digital wallet and displaying the list of operating agency servers, so that a user selects a target operating agency server from the list of operating agency servers;

step S102, communicating with the target operating agency server, so that the target operating agency server verifies the user;

step S103, determining whether the verification is passed; if the verification is passed, proceeding to step S104 or step S105 (specifically using step S104 or step S105 can be selectively set according to actual situations), otherwise, ending the flow;

step S104, sending a digital wallet opening request to a digital currency issuer agency server, so that the digital currency issuer agency server notifies a target operating agency server to execute a digital wallet opening operation and return a digital wallet opening result;

step S105, sending a digital wallet opening request to the target operating agency server, so that the target operating agency server executes a digital wallet opening operation, and return a digital wallet opening result to the digital currency issuer agency server;

Step S106: receiving the digital wallet opening result returned by the digital currency issuer agency server after a digital wallet is opened.

An operating agency server capable of opening a digital wallet is also an authorized operating agency server, and the agency server can provide an operation and management service for the digital wallet of a user. In the embodiments of the present disclosure, a list of authorized operating agency servers can be acquired by communicating with the digital currency issuer agency server, and the information checking process during digital wallet opening can be performed by communicating with the target operating agency server. During practical application, the digital wallet opening requests of all users can be processed uniformly by the digital currency wallet application terminal, after a user sends a digital wallet opening request to a digital currency wallet application terminal, the digital currency wallet application terminal forwards the request to a corresponding target operating agency server, the target operating agency server feeds back the digital wallet information to the digital currency issuer agency server after opening the digital wallet, and the digital currency issuer agency server returns a digital wallet opening result to the user after storing the data (i.e. recording the digital wallet information). Of course, in order to reduce the access amount of the digital currency issuer agency server, the target operating agency server may also directly process the digital wallet opening requests of all users; after having opened the digital wallet, the target operating agency server feeds back the digital wallet opening result to the user and feeds back the digital wallet information to the digital currency issuer agency server; and the digital currency issuer agency server records the digital wallet information.

In the embodiments of the present disclosure, a digital wallet opening entry is elevated to the digital currency issuer agency server or another authorized or unauthorized operating agency server, so that the user does not need to use a digital wallet opening method provided by an authorized operating agency server and can open digital wallets of multiple authorized operating agency servers on the same platform, thereby greatly reducing the threshold for a user to use a digital wallet and improving convenience.

The verification content for verifying the user by the target operating agency server can be set selectively according to practical situations, for example, according to the user type or the type of the digital wallet required to be opened by the user. In some embodiments of the present disclosure, before communicating with the target operating agency server, receiving a digital wallet level operation request of the user, and parsing a digital wallet level from the digital wallet level operation request; sending the digital wallet level to the target operating agency server, so that the target operating agency server determines, according to the digital wallet level, the verification content for verifying the user; generating the digital wallet opening request on the basis of the verification content that passes verification. For example, for digital wallets with lower operation permissions, such as type-5 or type-4 digital wallets, only verification of information such as a mobile phone number through a verification code is required. For digital wallets with higher operation permissions, such as type-3 digital wallets, digital wallet information can be further verified on the basis of verification of a verification code. For digital wallets with a high operation right, such as type-2 or type-1 digital wallets, the security level is required to be high, and the verification content may further comprise the bank account information in addition to the verification code and the digital wallet information. According to the present embodiment, different verification contents can be set according to the digital wallet level, thereby implementing diversified management.

In some embodiments of the present disclosure, the verification content comprises: a verification code; communicating with a target operating agency server, so that the target operating agency server verifies a user, comprises: sending to the target operating agency server a request for acquiring a verification code, and receiving a verification code returned by the target operating agency server in response to the request for acquiring a verification code; and sending to the target operating agency server a request for verifying a verification code, so that the target operating agency server verifies the user on the basis of the verification code, and receiving a verification result returned by the target operating agency server. After receiving the request for acquiring a verification code, the target operating agency server may generate a verification code by itself and return the verification code to the user, or may invoke an interconnected network to generate a verification code, and then return the generated verification code to the user by means of a short message service platform. By setting the verification code, it can be checked whether the mobile phone number of the user is correct.

In still some embodiments of the present disclosure, the verification content comprises digital wallet information; communicating with a target operating agency server, so that the target operating agency server verifies a user, comprises: receiving digital wallet information input by the user, and sending the digital wallet information to the target operating agency server, so that the target operating agency server verifies the user on the basis of the digital wallet information, and receiving a verification result returned by the target operating agency server. The digital wallet information refers to information related to the digital wallet, and the specific content thereof can be selectively set according to actual situations. In some embodiments of the present disclosure, the digital wallet information comprises digital wallet real-name information and digital wallet user's biometric information; communicating with a target operating agency server, so that the target operating agency server verifies a user, comprises: I. receiving digital wallet real-name information input by the user, and sending the digital wallet real-name information to the target operating agency server, so that the target operating agency server verifies the user on the basis of the digital wallet real-name information, and receiving a verification result returned by the target operating agency server; and II. receiving biometric information input by the user, and sending the biometric information to the target operating agency server, so that the target operating agency server verifies the user on the basis of the biometric information, and receiving a verification result returned by the target operating agency server.

The digital wallet real-name information refers to real-name information of a user, and the real-name information may be plain text real-name information, such as the user identity card number or passport number, and may also be ciphertext real-name information, such as a real-name identifier (e.g. an identifier obtained by hash processing) generated according to the user identity card number or the passport number bound to the digital wallet. The biometric information refers to information of a user's biometric feature, such as the iris, the face information and the fingerprint. By verifying the digital wallet information, the digital wallet security can be further improved.

In still other embodiments of the present disclosure, the verification content comprises: bank account information; communicating with a target operating agency server, so that the target operating agency server verifies a user, comprises: receiving bank account information input by the user, and sending the bank account information to the target operating agency server, so that the target operating agency server verifies the user on the basis of the bank account information, and receiving a verification result returned by the target operating agency server.

The bank account information refers to information related to the bank account of a user, and the specific content thereof can be set selectively according to actual situations, such as the bank card number information, a mobile phone number bound to the bank card, and a communication address bound to the bank card. In some embodiments of the present disclosure, the bank account information comprises bank card number information and a bound mobile phone number of a bank card. Communicating with a target operating agency server, so that the target operating agency server verifies a user, comprises: I. receiving bank card number information input by the user, and sending the bank card number information to the target operating agency server, so that the target operating agency server verifies the user on the basis of the bank card number information, and receiving a verification result returned by the target operating agency server; and II. receiving a mobile phone number bound to a bank card input by the user, and sending to the target operating agency server a request for acquiring a verification code, so that the target operating agency server queries an issuer bank of the bank card for the verification code, and receiving the verification code returned by the target operating agency server; and sending to the target operating agency server a request for verifying the verification code, so that the target operating agency server queries the issuer bank of the bank card for the verification code, and receiving the verification code returned by the target operating agency server. In practical application, it can also be verified according to the bank card number information whether the bank card input by the user is a bank card of an authorized agency.

After receiving the request for acquiring a verification code, the target operating agency server may generate a verification code by itself and return the verification code to the user, or may invoke an interconnected network to generate a verification code, and then return the generated verification code to the user by means of a short message service platform. By setting the verification code, it can be checked whether the mobile phone number of the user is correct. By checking the bank account information of the user, the security of the digital wallet can be further improved. The present embodiment is applicable to an application scenario of opening a digital wallet with a relatively high operation permission, for example, opening type-2 digital wallets or type-1 digital wallets.

In practical application process, the digital wallet level of a digital wallet can be opened can be defaulted; however, before the digital wallet opening request is sent to the target operating agency server or the digital currency issuer agency server, a digital wallet level operation request of a user is received, and the digital wallet level is parsed from the digital wallet level operation request. The present embodiment can satisfy the diversified requirements of opening digital wallets for different user types and opening different digital wallet levels for the same user, thereby improving the convenience of opening a digital wallet.

In the embodiment of the present disclosure, the digital wallet identifier of the digital wallet planned to be opened by the user can be automatically determined according to the default rule, for example, the digital wallets planned to be opened by the user may be marked in sequence with an auto-increment code, or before the digital wallet opening request is sent to the target operating agency server or the digital currency issuer agency server, a digital wallet identifier operation request of the user is received, and the digital wallet identifier is parsed from the digital wallet identifier operation request. The digital wallet identifier may be a digital wallet name, a unique code of the digital wallet, a display icon of the digital wallet, etc. The embodiments of the present disclosure can meet the user's personalized needs for digital wallet identifiers.

When using a digital wallet for transactions, a payment password is usually required. The payment password may be set by the user after the target operating agency server or the digital currency issuer agency server has opened the digital wallet, or may be determined before sending a digital wallet opening request to a target operating agency server or a digital currency issuer agency server, for example, before the digital wallet opening request is sent to the target operating agency server or the digital currency issuer agency server, the payment password operation request of the user is received, and a payment password of digital wallet is parsed from the payment password operation request.

In the practical application process, after receiving the digital wallet opening result returned by the target operating agency server, the digital currency issuer agency server can store the relevant information of the opened digital wallet for the purpose of checking. The relevant information comprises at least one of the following: a digital wallet name, a digital wallet ID (a digital wallet identifier other than the digital wallet name), and a bound mobile phone number. When the digital wallet opened by the user is a real-name digital wallet, the relevant information may further comprise the real-name information of the digital wallet. The real-name information may be a user identity card number, a passport number, etc. Generally, in order to protect the user privacy information and the account security, the real-name information is stored in the form of ciphertext, and the manner for encrypting real-name information can be selectively set according to actual situations.

Figure 2:
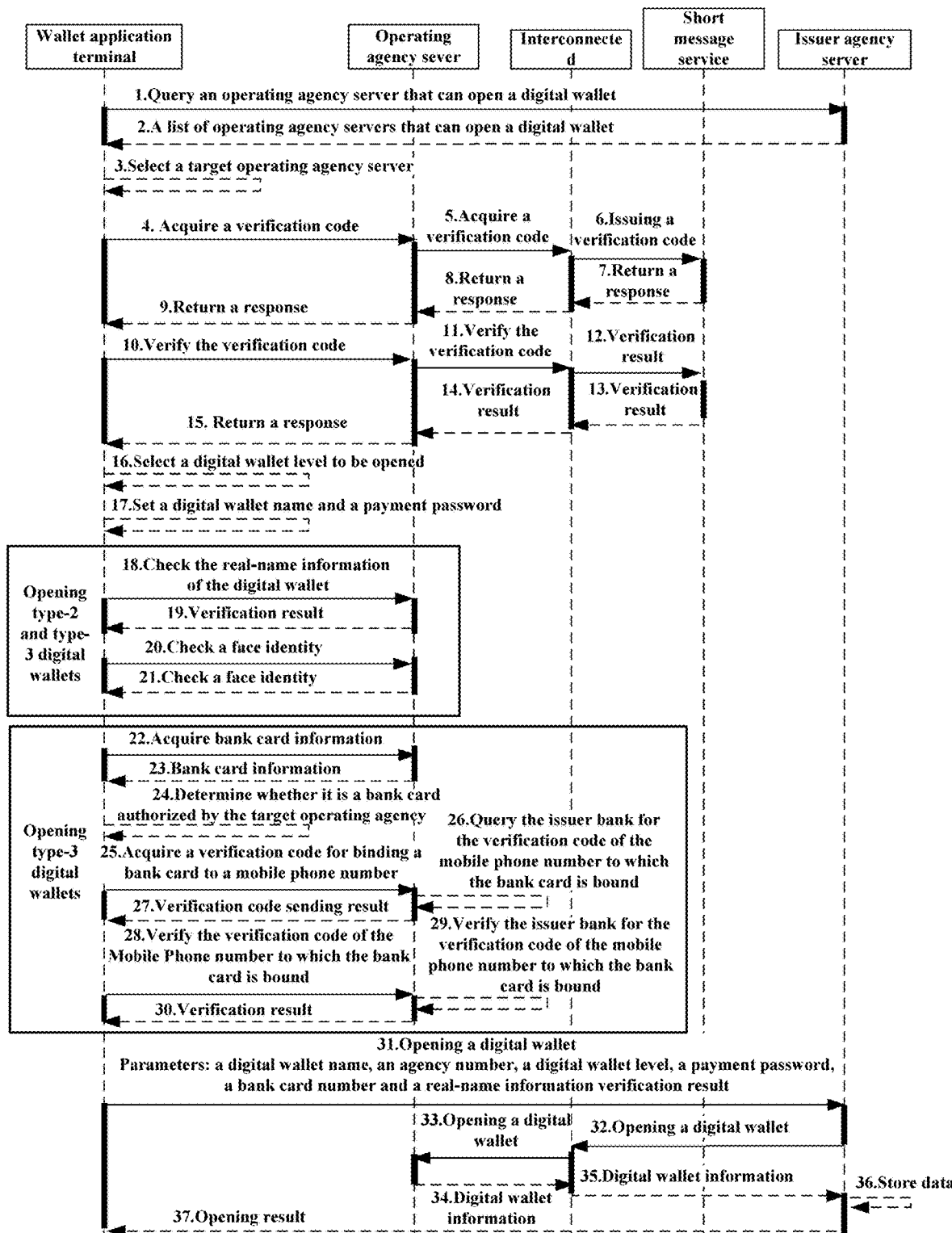
FIG. 2 is a schematic diagram of a main flow for opening a digital wallet according to an embodiment of the present disclosure.

FIG. 2 is a schematic diagram of a main flow for opening a digital wallet according to an embodiment of the present disclosure. In the present embodiment, the execution body of the method for opening a digital wallet is a wallet application terminal. As shown in FIG. 2, the flow for opening a digital wallet mainly comprises the following steps:

1. a wallet application terminal queries a digital or digital currency issuer agency server for a request of an operating agency server that can open a digital wallet;

2. the digital currency issuer agency server returns, to the wallet application terminal, a list of operating agency servers that can open a digital wallet;

3. a user selects a target operating agency server from the list of operating agency servers to perform the process of digital wallet opening verification;

4. the wallet application terminal acquires a verification code from the target operating agency server;

5. the target operating agency server acquires a verification code from the interconnected network;

6. the interconnected network generates a verification code and then issues the verification code to a short message service platform;

7. the short message service platform returns a response to the interconnected network;

8. the interconnected network returns a response to the target operating agency server;

9. the target operating agency server returns a response to the wallet application terminal;

10. the wallet application terminal requests the target operating agency server to verify the verification code;

11. the target operating agency server requests the interconnected network to verify the verification code;

12. after verifying the verification code, the interconnected network issues a verification result to the short message service platform;

13. the short message service platform returns a response to the interconnected network;

14. the interconnected network returns a response to the target operating agency server;

15. the target operating agency server returns a response to the wallet application terminal;

16. a user selects, at a wallet application terminal, a digital wallet level to be opened;

17. the user sets a digital wallet name and a payment password on the wallet application terminal;

18. the wallet application terminal requests the target operating agency server to check the real-name information of the digital wallet;

19. the target operating agency server can perform Optical Character Recognition (OCR) on certificate information of the user, and the target operating agency server returns a verification result to the wallet application terminal;

20. the wallet application terminal requests the target operating agency server to check a face identity;

21. the target operating agency server returns a verification result to the wallet application terminal;

22. the wallet application terminal acquires bank card information from the target operating agency server;

23. the target operating agency server returns the bank card information to the wallet application terminal;

24. the target operating agency server determines whether the bank card input by the user is a bank card authorized by the target operating agency server;

25. the wallet application terminal acquires, from a target operating agency server, a verification code for binding a bank card to a mobile phone number;

26. the target operating agency server queries the issuer bank for the verification code of the mobile phone number to which the bank card is bound;

27. the target operating agency server returns a verification code sending result to the wallet application terminal;

28. the wallet application terminal requests the target operating agency server to verify the verification code of the mobile phone number to which the bank card is bound;

29. the target operating agency server verifies, from the issuer bank, the verification code of the mobile phone number to which the bank card is bound;

30. the target operating agency server returns a verification result to the wallet application terminal;

31. the wallet application terminal sends, to the digital currency issuer agency server, a request for opening a digital wallet, wherein the request comprises parameters such as a digital wallet name, an agency number, a digital wallet level, a payment password, a bank card number (if any), and a real-name information verification result (if any);

32. the digital currency issuer agency server sends a digital wallet opening request to the interconnected network;

33. the interconnected network sends the digital wallet opening request to the target operating agency server;

34. after the digital wallet is opened, the target operating agency server sends the digital wallet information to the interconnected network;

35. the interconnected network sends the digital wallet information to the digital currency issuer agency server;

36. the digital currency issuer agency server stores data;

37. the digital currency issuer agency server transmits a digital wallet opening result to the wallet application terminal.

When opening type-1 and type-2 digital wallets, the users are required to provide bank card information, when opening type-3 digital wallets, the users are not required to provide bank card information; and when opening type-4 and type-5 digital wallets, the users are not required to provide real-name information. Therefore, if the user selects type-3 digital wallets, steps 22 to 30 may not be executed; if the user selects type-4 or type-5 digital wallets, the digital wallet opening request in step 31 may not comprise parameters such as bank card number and real-name information verification result.

In the embodiments of the present disclosure, on the basis of the dual-layer operation architecture, a digital wallet opening entry is elevated to the digital currency issuer agency server or other unauthorized operating agency servers from the authorized operating agency servers, so that the user does not need to use a digital wallet opening method provided by an authorized operating agency server and can open digital wallets of multiple authorized operating agency servers on the same platform, thereby greatly reducing the threshold for a user to use a digital wallet and improving convenience. Furthermore, the method for opening a digital wallet in the embodiment of the present disclosure also supports the direct opening of type-2 and type-3 digital wallets, without upgrading from type-4 and type-5 digital wallets, thereby realizing the same functional experience as off-line processing.

According to a second aspect of an embodiment of the present disclosure, a wallet application terminal for implementing the described method is provided.

Figure 3:
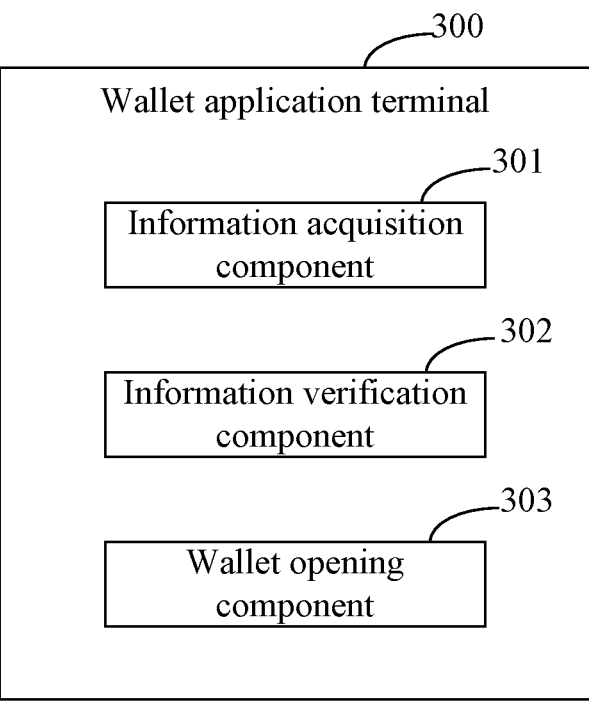
FIG. 3 is a schematic diagram of main components of a wallet application terminal according to an embodiment of the present disclosure.

FIG. 3 is a schematic diagram of main components of a wallet application terminal according to an embodiment of the present disclosure. As shown in FIG. 3, the wallet application terminal 300 comprises:

an information acquisition component 301 configured to acquire, from a digital currency issuer agency server, a list of operating agency servers that can open a digital wallet and displaying the list of operating agency servers, so that a user selects a target operating agency server from the list of operating agency servers;

an information verification component 302 configured to communicate with the target operating agency server, so that the target operating agency server verifies the user; and a wallet opening component 303 configured to send, if the verification is passed, a digital wallet opening request to the digital currency issuer agency server, so that the digital currency issuer agency server notifies the target operating agency server to perform a digital wallet opening operation and returns a digital wallet opening result, or send a digital wallet opening request to the target operating agency server to cause the target operating agency server to perform a digital wallet opening operation and return a digital wallet opening result to the digital currency issuer agency server; and receive a digital wallet opening result returned by the digital currency issuer agency server after a digital wallet is opened.

In some embodiments of the present disclosure, the information acquisition component is further configured to receive, before communicating with the target operating agency server, a digital wallet level operation request of the user, and parse a digital wallet level from the digital wallet level operation request;

the information verification component is further configured to: send the digital wallet level to the target operating agency server, so that the target operating agency server determines, according to the digital wallet level, a verification content for verifying the user;

the wallet opening component is further to generate the digital wallet opening request on the basis of the verification content that passes verification.

In some embodiments of the present disclosure, the verification content comprises a verification code; the information verification component communicating with the target operating agency server, so that the target operating agency server verifies the user comprises:

sending to the target operating agency server a request for acquiring a verification code, and receiving a verification code returned by the target operating agency server in response to the request for acquiring a verification code; and sending to the target operating agency server a request for verifying a verification code, so that the target operating agency server verifies the user on the basis of the verification code, and receiving a verification result returned by the target operating agency server.

In some embodiments of the present disclosure, the verification content comprises digital wallet information; the information verification component communicating with the target operating agency server, so that the target operating agency server verifies the user comprises:

receiving digital wallet information input by the user, and sending the digital wallet information to the target operating agency server, so that the target operating agency server verifies the user on the basis of the digital wallet information, and receiving a verification result returned by the target operating agency server.

In some embodiments of the present disclosure, the digital wallet information comprises digital wallet real-name information and digital wallet user's biometric information; the information verification component communicating with the target operating agency server, so that the target operating agency server verifies the user comprises:

receiving digital wallet real-name information input by the user, and sending the digital wallet real-name information to the target operating agency server, so that the target operating agency server verifies the user on the basis of the digital wallet real-name information, and receiving a verification result returned by the target operating agency server;

receiving biometric information input by the user, and sending the biometric information to the target operating agency server, so that the target operating agency server verifies the user on the basis of the biometric information, and receiving a verification result returned by the target operating agency server.

In some embodiments of the present disclosure, the verification content comprises bank account information; the information verification component communicating with the target operating agency server, so that the target operating agency server verifies the user comprises:

receiving bank account information input by the user, and sending the bank account information to the target operating agency server, so that the target operating agency server verifies the user on the basis of the bank account information, and receiving a verification result returned by the target operating agency server.

In some embodiments of the present disclosure, the bank account information comprises bank card number information and a mobile phone number bound to a bank card; the information verification component communicating with the target operating agency server, so that the target operating agency server verifies the user comprises:

receiving bank card number information input by the user, and sending the bank card number information to the target operating agency server, so that the target operating agency server verifies the user on the basis of the bank card number information, and receiving a verification result returned by the target operating agency server;

verifying, according to the bank card number information, whether a bank card input by the user is a bank card of an authorized authority;

receiving a mobile phone number bound to a bank card input by the user, and sending to the target operating agency server a request for acquiring a verification code, so that the target operating agency server queries an issuer bank of the bank card for the verification code, and receiving the verification code returned by the target operating agency server; and receiving a mobile phone number bound to a bank card and input by the user, and sending to the target operating agency server a request for verifying the verification code, so that the target operating agency server queries the issuer bank of the bank card for the verification code, and receiving the verification code returned by the target operating agency server.

In some embodiments of the present disclosure, before the wallet opening component sends the digital wallet opening request to the target operating agency server or the digital currency issuer agency server, the information verification component is further configured to:

receive a digital wallet identifier operation request of the user, and parse a digital wallet identifier from the digital wallet identifier operation request; and receive a payment password operation request from the user, and parse a payment password of digital wallet from the payment password operation request.

In some embodiments of the present disclosure, after receiving the digital wallet opening result returned by the target operating agency server, the digital currency issuer agency server stores relevant content of an opened digital wallet, the relevant information comprising at least one of the following: a digital wallet name, a digital wallet ID and a bound mobile phone number.

According to a third aspect of the embodiments of the present disclosure, a system for implementing the described method is provided.

Figure 4:
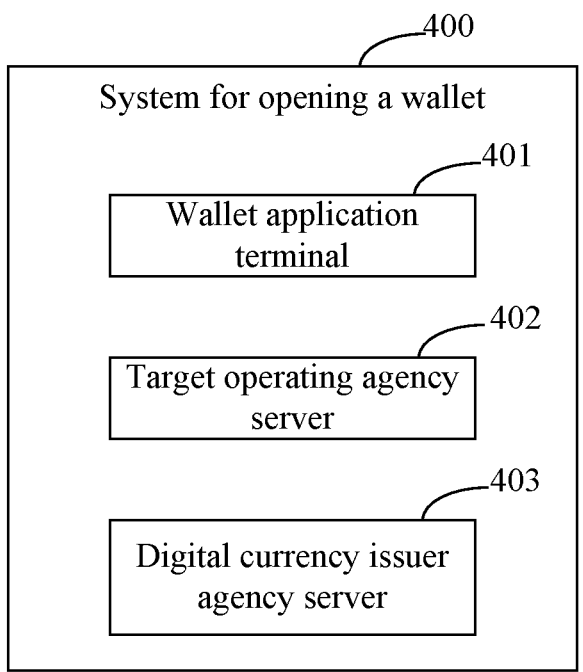
FIG. 4 is a schematic diagram of main components of a system for opening a digital wallet according to an embodiment of the present disclosure.

FIG. 4 is a schematic diagram of main components of a system for opening a digital wallet according to an embodiment of the present disclosure. As shown FIG. 4, a system for opening a digital wallet comprises: a wallet application terminal 401, a target operating agency server 402 and a digital currency issuer agency server 403; wherein, the wallet application terminal 401 sends, to the digital currency issuer agency server 403, a request for querying a list of operating agency servers that can open a digital wallet; the digital currency issuer agency server 403 returns the list of operating agency servers to the wallet application terminal;

the wallet application terminal 401 displays the list of operating agency servers to a user, so that the user selects the target operating agency server from the list of operating agency servers 402;

the wallet application terminal 401 communicates with the target operating agency server 402, and the target operating agency server 402 verifies the user, and returns a verification result to the wallet application terminal 401;

if the verification is passed, the wallet application terminal 401 sends a digital wallet opening request to the digital currency issuer agency server 403, the digital currency issuer agency server 403 notifies the target operating agency server 402 to execute a digital wallet opening operation in response to the digital wallet opening request, the target operating agency server 402 executes a digital wallet opening operation and then returns a digital wallet opening result to the digital currency issuer agency server, and the digital currency issuer agency server returns the digital wallet opening result to the wallet application terminal 401; or, the wallet application terminal 401 sends a digital wallet opening request to the target operating agency server 402, the target operating agency server 402 executes a digital wallet opening operation in response to the digital wallet opening request, and returns a digital wallet opening result to the digital currency issuer agency server 403; and the digital currency issuer agency server 403 returns the digital wallet opening result to the wallet application terminal 401.

In some embodiments of the present invention, the target operating agency server 402 belongs to one or more of the operating agency servers.

In some embodiments of the present disclosure, before communicating with the target operating agency, the digital currency issuer agency server 403 receives a digital wallet level operation request of the user, and parses a digital wallet level from the digital wallet level operation request;

the digital currency issuer agency server 403 sends the digital wallet level to the target operating agency server 402, so that the target operating agency server 402 determines, according to the digital wallet level, a verification content for verifying the user;

digital currency issuer agency server 403 generates the digital wallet opening request on the basis of the verification content that passes verification.

In some embodiments of the present disclosure, the wallet application terminal 401 sends to the target operating agency server 402 a request for acquiring a verification code, and the target operating agency server 402 returns the verification code to the wallet application terminal 401 in response to the request for acquiring a verification code;

the wallet application terminal 401 sends to the target operating agency server 402 a request for verifying a verification code, the target operating agency server 402 verifies the user on the basis of the verification code, and then returns a verification result to the wallet application terminal 401.

In some embodiments of the present disclosure, the wallet application terminal 401 receives the digital wallet information input by the user and sends the digital wallet information to the target operating agency server 402; the target operating agency server 402 verifies the user on the basis of the digital wallet information, and then returns a verification result to the wallet application terminal 401.

In some embodiments of the present disclosure, the digital wallet information comprises digital wallet real-name information and digital wallet user's biometric information; the wallet application terminal 401 receives the digital wallet real-name information input by the user and sends the digital wallet real-name information to the target operating agency server 402; the target operating agency server 402 verifies the user on the basis of the digital wallet real-name information, and then returns a verification result to the wallet application terminal 401;

the wallet application terminal 401 receives the biological feature input by the user and sends the biological feature to the target operating agency server 402; the target operating agency server 402 verifies the user on the basis of the biological information, and then returns a verification result to the wallet application terminal 401.

In some embodiments of the present disclosure, the wallet application terminal 401 receives the bank account information input by the user and sends the bank account information to the target operating agency server 402; the target operating agency server 402 verifies the user on the basis of the bank account information, and then returns a verification result to the wallet application terminal 401.

In some embodiments of the present disclosure, the bank account information comprises bank card number information and a mobile phone number bound to a bank card; the wallet application terminal 401 receives the bank card number information input by the user and sends the bank card number information to the target operating agency server 402; the target operating agency server 402 verifies the user on the basis of the bank card number information, and then returns a verification result to the wallet application terminal 401.

the wallet application terminal 401 verifies, according to the bank card number information, whether a bank card input by the user is a bank card of an authorized authority;

the wallet application terminal 401 receives a mobile phone number bound to a bank card input by the user, and sends to the target operating agency server 402 a request for acquiring a verification code; the target operating agency server 402 queries an issuer bank of the bank card for the verification code, and returns the verification code to the wallet application terminal; the wallet application terminal 401 sends to the target operating agency server 402 a request for verifying the verification code, and the target operating agency server 402 queries the issuer bank for the verification code, and then returns a verification result to the wallet application terminal 401.

In some embodiments of the present disclosure, the wallet application terminal 401 receives a digital wallet level operation request of the user, and parses a digital wallet level from the digital wallet level operation request;

the wallet application terminal 401 receives a digital wallet identifier operation request of the user, and parses a digital wallet identifier from the digital wallet identifier operation request;

the wallet application terminal 401 receives a payment password operation request from the user, and parses a payment password of digital wallet from the payment password operation request.

In some embodiments of the present disclosure, after receiving the digital wallet opening result returned by the target operating agency server 402, the digital currency issuer agency server 403 stores relevant content of an opened digital wallet, the relevant information comprising at least one of the following: a digital wallet name, a digital wallet ID and a bound mobile phone number.

According to a fourth aspect of the embodiments of the present disclosure, provided is an electronic device for opening a digital wallet, comprising:

one or more processors;

a storage device for storing one or more programs, when the one or more programs are executed by the one or more processors, the one or more processors implement the method provided by the first aspect of the embodiments of the present disclosure.

According to a fifth aspect of the embodiments of the present disclosure, provided is a computer readable medium, on which a computer program is stored, wherein the program, when executed by a processor, implements the method provided by the first aspect of the embodiments of the present disclosure.

Figure 5:
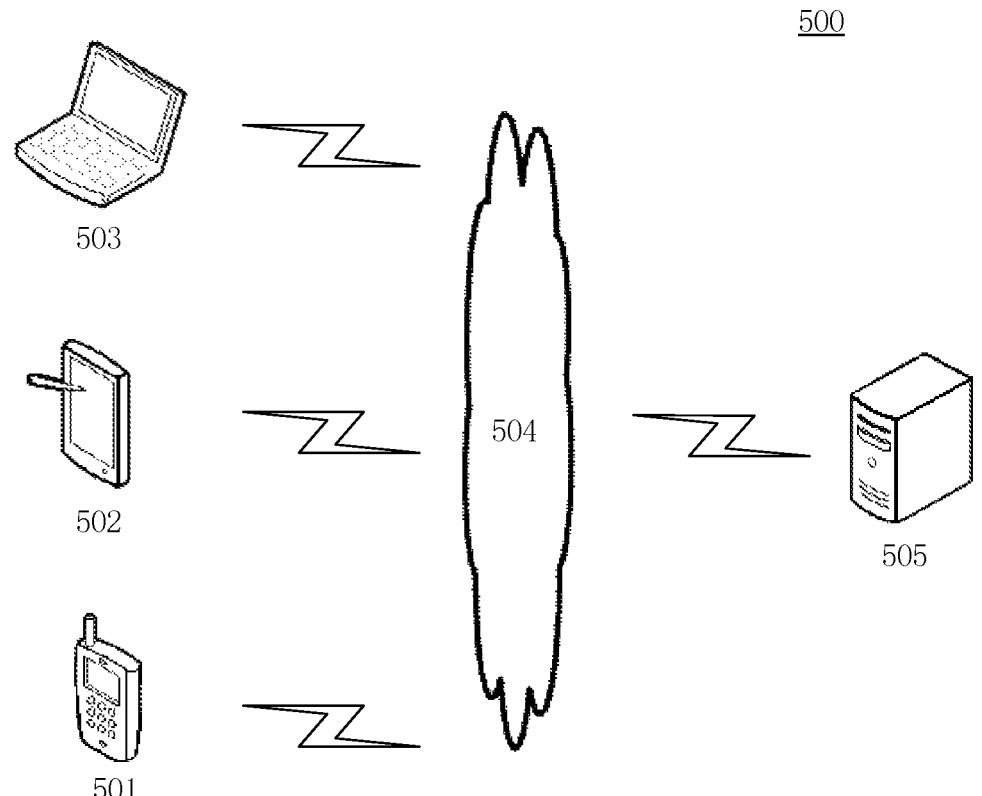
FIG. 5 is an exemplary system architecture diagram in which the embodiments of the present disclosure may be applied.

FIG. 5 illustrates an exemplary system architecture 500 of a method for opening a digital wallet or a wallet application terminal to which the embodiments of the present disclosure can be applied.

As shown in FIG. 5, the system architecture 500 may comprise terminal devices 501, 502 and 503, a network 504, and a server 505. The network 504 is a medium that may be used to provide communication links between the terminal devices 501, 502 and 503 and the server 505. The network 504 may comprise a variety of connection types, such as a wire, a wireless communication link or a fiber optic cable.

A user may use the terminal devices 501, 502 and 503 to interact with the server 505 over the network 504, to receive or send messages, etc. Various communication client applications, such as shopping applications, webpage browser applications, search applications, instant messaging tools, mailbox clients, and social platform software (for example only), may be installed on the terminal devices 501, 502 and 503.

The terminal devices 501, 502 and 503 may be various electronic devices that have a display screen and support webpage browsing, including but not limited to a smart phone, a tablet computer, a laptop portable computer, a desktop computer, etc.

The server 505 may be a server providing various services, for example, a backend management server providing support for shopping websites browsed by users by using the terminal devices 501, 502 and 503 (for example only). The backend management server may perform processing such as analysis on the received data such as a product information query request, and feed back a processing result (such as target push information and product information, for example only) to the terminal device.

It should be noted that the method for opening a digital wallet provided by the embodiment of the present disclosure may be executed by the terminal devices 501, 502 and 503. Accordingly, the wallet application terminal is provided in the terminal devices 501, 502 and 503.

It should be understood that the number of terminal devices, the number of networks and the number of servers in FIG. 5 are merely illustrative. There may be any number of terminal devices, any number of networks, and any number of servers, depending on the requirement needs.

Figure 6:
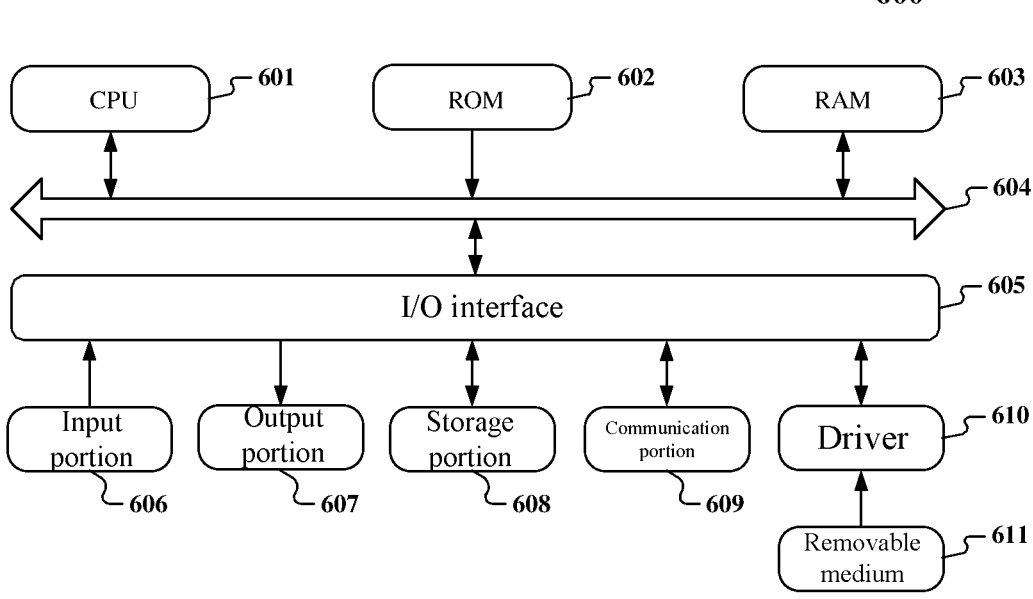
FIG. 6 is a schematic structural diagram of a computer system suitable of a terminal device or a server for implementing an embodiment of the present disclosure.

Referring now to FIG. 6 which shows a block diagram of a computer system 600 a terminal device suitable for implementing an embodiment of the present disclosure. The terminal device illustrated in FIG. 6 is merely an example, and is not intended to limit functions and scope of application of the embodiments of the present disclosure.

As shown in FIG. 6, the computer system 600 comprises a central processing unit (CPU) 601 that can perform various suitable actions and processes in accordance with a program stored in a read only memory (ROM) 602 or a program loaded from a storage portion 608 into a random access memory (RAM) 603. In the RAM 603, various programs and data necessary for the operation of the system 600 are also stored. The CPU 601, the ROM 602 and the RAM 603 are connected to one another by means of a bus 604. An input/output (I/O) interface 605 is also connected to the bus 604.

The following components are connected to the I/O interface 605: an input portion 606 including a keyboard, mouse, etc.; an output portion 607 including, for example, a cathode ray tube (CRT), a liquid crystal display (LCD) and a speaker; a storage portion 608 including a hard disk, etc.; and a communication portion 609 including a network interface card such as an LAN card and a modem. The communication portion 609 performs communication processing by means of a network such as the Internet. A driver 610 is also connected to an I/O interface 605 as required. A removable medium 611 such as a magnetic disk, an optical disk, a magneto-optical disk and a semiconductor memory is installed on the drive 610 as required, so that a computer program read therefrom is installed into the storage portion 608 as required.

In particular, according to the embodiments of the present disclosure, the processes described above with reference to the flowcharts can be implemented as computer software programs. For example, the embodiments of the present disclosure include a computer program product comprising a computer program carried on a computer readable medium. The computer program comprises a program code for executing the method as shown in the flowchart. In such embodiments, the computer program may be downloaded and installed from the network by means of a communication portion 609, and/or installed from a removable medium 611. When the computer program is executed by the central processing unit (CPU) 601, the described functions defined in the system of the present disclosure are executed.

It should be noted that the computer readable medium in the present disclosure may be a computer readable signal medium or a computer readable storage medium, or any combination thereof. The readable storage medium can be, for example, but is not limited to, an electronic, magnetic, optical, electromagnetic, infrared, or semiconductor system, apparatus, or device, or any combination thereof. More specific examples of the computer readable storage medium may include, but are not limited to, electrical connections with one or more wires, a portable computer disk, a hard disk, a random access memory (RAM), a read-only memory (ROM), an erasable Programmable read-only memory (EPROM or flash memory), an optical fiber, a portable compact disk read-only memory (CD-ROM), an optical storage device, a magnetic storage device, or any suitable combination of the above. In the present disclosure, the computer readable storage medium may be any tangible medium that can contain or store programs for use by or in combination with an instruction execution system, apparatus, or device. In the present disclosure, the computer-readable signal medium can include a data signal in baseband or propagated as part of a carrier wave, which carries readable program codes. Such a propagated data signal can take many forms, including but not limited to electromagnetic signals, optical signals, or any suitable combination of the above. The readable signal medium can also be any readable medium other than a readable storage medium, and the readable medium can send, propagate, or transmit a program for use by or in combination with an instruction execution system, apparatus, or device. The program codes contained on the readable medium can be transmitted through any appropriate medium, including but not limited to wireless, wired, optical fiber cable, RF, etc., or any suitable combination of the above.

The flowcharts and block diagrams in the drawings show possible architectures, functions, and operations of the system, method, and computer program product according to the embodiments of the present disclosure. In this regard, each block in the flowcharts or block diagrams may represent a component, a program segment, or part of codes containing one or more executable instructions for implementing specified logical functions. It is also to be noted that in some alternative implementations, the functions marked in the blocks may occur in an order different from those marked in the drawings. For example, two successive blocks may, in fact, be executed basically in parallel or in a reverse order, which depends on the functions involved. It is also to be noted that each block in the block diagrams and/or flowcharts and a combination of blocks in the block diagrams and/or flowcharts may be implemented by a special-purpose hardware-based system executing a specified function or operation or may be implemented by a combination of special-purpose hardware and computer instructions.

The components involved in the embodiments of the present disclosure may be implemented by software or hardware. The described components can also be provided in a processor. For example, the processor can be described as: a processor comprises: an information acquisition component configured to acquire, from a digital currency issuer agency server, a list of operating agency servers that can open a digital wallet and displaying the list of operating agency servers, so that a user selects a target operating agency server from the list of operating agency servers; an information verification component configured to communicate with the target operating agency server, so that the target operating agency server verifies the user; and a wallet opening component configured to send, when the verification is passed, a digital wallet opening request to the target operating agency server or the digital currency issuer agency server, and receive a digital wallet opening result returned by the target operating agency server or the digital currency issuer agency server after the digital wallet is opened. The name of a component is not intended to limit the unit itself in a certain circumstance, for example, the information acquisition component may also be described as "a component for sending a digital wallet opening request to the target operating agency server or the digital currency issuer agency server".

As another aspect, the present disclosure also provides a computer readable medium. The computer readable medium may be included in the device described in the above embodiments, or a stand-alone computer readable medium not assembled into the device. The computer readable medium carries one or more programs, the one or more programs, when executed by the device, cause the device to: acquire, from a digital currency issuer agency server, a list of operating agency servers that can open a digital wallet and displaying the list of operating agency servers, so that a user selects a target operating agency server from the list of operating agency servers; communicate with the target operating agency server, so that the target operating agency server verifies the user; send, when the verification is passed, a digital wallet opening request to the target operating agency server or the digital currency issuer agency server, and receive a digital wallet opening result returned by the target operating agency server or the digital currency issuer agency server after the digital wallet is opened.

According to the technical solution of the embodiments of the present disclosure, a digital wallet opening entry is elevated to the digital currency issuer agency server or other authorized or unauthorized operating agency servers, so that the user does not need to use a digital wallet opening method provided by an authorized operating agency server and can open digital wallets of multiple authorized operating agency servers on the same platform, thereby greatly reducing the threshold for a user to use a digital wallet and improving convenience.

The specific embodiments do not limit the scope of protection of the present disclosure. It will be apparent to a person skilled in the art that various modifications, combinations, sub-combinations, and replacements can be made according to design requirements and other factors. Any modifications, equivalent replacements, improvements, etc. made within the spirit and principle of the present disclosure shall belong to the scope of protection of the present disclosure.

The invention claimed is:

1. A method for opening a digital wallet, applied to a wallet application terminal, comprising:
acquiring, from a digital currency issuer agency server, a list of operating agency servers that can open a digital wallet and displaying the list of operating agency servers, so that a user selects a target operating agency server from the list of operating agency servers, wherein the digital currency issuer agency server comprises a plurality of digital wallet opening entrances of authorized operating agency servers;
communicating with the target operating agency sever, so that the target operating agency server verifies the user;
in response to a verification being passed, sending a digital wallet opening request to the digital currency issuer agency server, so that the digital currency issuer agency server notifies the target operating agency server to perform a digital wallet opening operation and return a digital wallet opening result, or sending the digital wallet opening request to the target operating agency server to cause the target operating agency server to perform the digital wallet opening operation and return a digital wallet opening result to the digital currency issuer agency server; and receiving a digital wallet opening result returned by the digital currency issuer agency server after a digital wallet is opened.

2. The method as claimed in claim 1, wherein before communicating with the target operating agency server, the method further comprises: receiving a digital wallet level operation request of the user, and parsing a digital wallet level from the digital wallet level operation request;

communicating with the target operating agency server further comprises: sending the digital wallet level to the target operating agency server, so that the target operating agency server determines, according to the digital wallet level, a verification content for verifying the user;

the method further comprises: generating the digital wallet opening request on the basis of the verification content that passes verification.

3. The method as claimed in claim 2, wherein the verification content comprises a verification code; communicating with the target operating agency server, so that the target operating agency server verifies the user comprises:

sending to the target operating agency server a request for acquiring a verification code, and receiving the verification code returned by the target operating agency server in response to the request for acquiring the verification code; and sending to the target operating agency server a request for verifying the verification code, so that the target operating agency server verifies the user on the basis of the verification code, and receiving a verification result returned by the target operating agency server.

4. The method as claimed in claim 2, wherein the verification content comprises digital wallet information; communicating with the target operating agency server, so that the target operating agency server verifies the user comprises:

receiving digital wallet information input by the user, and sending the digital wallet information to the target operating agency server, so that the target operating agency server verifies the user on the basis of the digital wallet information, and receiving a verification result returned by the target operating agency server.

5. The method as claimed in claim 4, wherein the digital wallet information comprises digital wallet real-name information and digital wallet user's biometric information; communicating with the target operating agency server, so that the target operating agency server verifies the user comprises:

receiving digital wallet real-name information input by the user, and sending the digital wallet real-name information to the target operating agency server, so that the target operating agency server verifies the user on the basis of the digital wallet real-name information, and receiving a verification result of the digital wallet real-name information returned by the target operating agency server; and receiving biometric information input by the user, and sending the biometric information to the target operating agency server, so that the target operating agency server verifies the user on the basis of the biometric information, and receiving a verification result of the biometric information returned by the target operating agency server.

6. The method as claimed in claim 2, wherein the verification contents comprise bank account information; communicating with the target operating agency server, so that the target operating agency server verifies the user comprises:

receiving bank account information input by the user, and sending the bank account information to the target operating agency server, so that the target operating agency server verifies the user on the basis of the bank account information; and receiving a verification result returned by the target operating agency server.

7. The method as claimed in claim 6, wherein the bank account information comprises bank card number information and a mobile phone number bound to a bank card; communicating with the target operating agency server, so that the target operating agency server verifies the user comprises:

receiving bank card number information input by the user, and sending the bank card number information to the target operating agency server, so that the target operating agency server verifies the user on the basis of the bank card number information, and receiving a verification result returned by the target operating agency server;

verifying, according to the bank card number information, whether a bank card input by the user is a bank card of an authorized authority;

receiving a mobile phone number bound to a bank card input by the user, and sending to the target operating agency server a request for acquiring a verification code, so that the target operating agency server queries an issuer bank of the bank card for the verification code, and receiving the verification code returned by the target operating agency server; and sending to the target operating agency server a request for verifying the verification code, so that the target operating agency server queries the issuer bank for the verification code, and receiving a verification result returned by the target operating agency server.

8. The method as claimed in claim 1, wherein before sending the digital wallet opening request to the target operating agency server or the digital currency issuer agency server, the method further comprises:

receiving a digital wallet identifier operation request of the user, and parsing a digital wallet identifier from the digital wallet identifier operation request; and receiving a payment password operation request from the user, and parsing a payment password of digital wallet from the payment password operation request.

9. The method as claimed in claim 1, wherein after receiving the digital wallet opening result returned by the target operating agency server, the digital currency issuer agency server stores relevant information of an opened digital wallet, the relevant information comprising at least one of the following: a digital wallet name, a digital wallet ID and a bound mobile phone number.

10. A system for opening a digital wallet, comprising: a wallet application terminal, a target operating agency server and a digital currency issuer agency server; wherein, the wallet application terminal sends, to the digital currency issuer agency server, a request for querying a list of operating agency servers that can open a digital wallet; the digital currency issuer agency server returns the list of operating agency servers to the wallet application terminal, wherein the digital currency issuer agency server comprises a plurality of digital wallet opening entrances of authorized operating agency servers;

the wallet application terminal displays the list of operating agency servers to a user, so that the user selects the target operating agency server from the list of operating agency servers;

the wallet application terminal communicates with the target operating agency server, and the target operating agency server verifies the user, and returns a verification result to the wallet application terminal;

in response to the verification being passed, the wallet application terminal sends a digital wallet opening request to the digital currency issuer agency server, the digital currency issuer agency server notifies the target operating agency server to execute a digital wallet opening operation in response to the digital wallet opening request, the target operating agency server executes the digital wallet opening operation and then returns a digital wallet opening result to the digital currency issuer agency server, and the digital currency issuer agency server returns the digital wallet opening result to the wallet application terminal; or, the wallet application terminal sends a digital wallet opening request to the target operating agency server, the target operating agency server executes a digital wallet opening operation in response to the digital wallet opening request, and returns a digital wallet opening result to the digital currency issuer agency server; and the digital currency issuer agency server returns the digital wallet opening result to the wallet application terminal.

11. An electronic device for opening a digital wallet, comprising:

one or more processors;

a storage device for storing one or more programs, when the one or more programs are executed by the one or more processors, the one or more processors implement the method as claimed in claim 1.

12. The method as claimed in claim 9, wherein the opened digital wallet is a real-name digital wallet, the relevant information comprising real-name information of the opened digital wallet, and the real-name information is stored in a form of ciphertext.

13. The system as claimed in claim 10, wherein before the wallet application terminal communicates with the target operating agency server, the system further comprising:

the wallet application terminal receives a digital wallet level operation request of the user, and the wallet application terminal parses a digital wallet level from the digital wallet level operation request;

the wallet application terminal communicates with the target operating agency server further comprising: the wallet application terminal sends the digital wallet level to the target operating agency server, so that the target operating agency server determines, according to the digital wallet level, a verification content for verifying the user;

the system further comprising: the wallet application terminal generates the digital wallet opening request on the basis of the verification content that passes verification.

14. The system as claimed in claim 13, wherein the verification content comprises a verification code; the wallet application terminal communicates with the target operating agency server, and the target operating agency server verifies the user comprising:

the wallet application terminal sends to the target operating agency server a request for acquiring a verification code, and the wallet application terminal receives the verification code returned by the target operating agency server in response to the request for acquiring the verification code; and the wallet application terminal sends to the target operating agency server a request for verifying the verification code, so that the target operating agency server verifies the user on the basis of the verification code, and the wallet application terminal receives a verification result returned by the target operating agency server.

15. The system as claimed in claim 13, wherein the verification content comprises digital wallet information; the wallet application terminal communicates with the target operating agency server, and the target operating agency server verifies the user comprising:

the wallet application terminal receives digital wallet information input by the user, and the wallet application terminal sends the digital wallet information to the target operating agency server, so that the target operating agency server verifies the user on the basis of the digital wallet information, and the wallet application terminal receives a verification result returned by the target operating agency server.

16. The system as claimed in claim 15, wherein the digital wallet information comprises digital wallet real-name information and digital wallet user's biometric information; the wallet application terminal communicates with the target operating agency server, and the target operating agency server verifies the user comprising:

the wallet application terminal receives digital wallet real-name information input by the user, and the wallet application terminal sends the digital wallet real-name information to the target operating agency server, so that the target operating agency server verifies the user on the basis of the digital wallet real-name information, and the wallet application terminal receives a verification result of the digital wallet real-name information returned by the target operating agency server; and the wallet application terminal receives biometric information input by the user, and the wallet application terminal sends the biometric information to the target operating agency server, so that the target operating agency server verifies the user on the basis of the biometric information, and the wallet application terminal receives a verification result of the biometric information returned by the target operating agency server.

17. The system as claimed in claim 13, wherein the verification contents comprise bank account information; the wallet application terminal communicates with the target operating agency server, and the target operating agency server verifies the user comprising:

the wallet application terminal receives bank account information input by the user, and the wallet application terminal sends the bank account information to the target operating agency server, so that the target operating agency server verifies the user on the basis of the bank account information; and the wallet application terminal receives a verification result returned by the target operating agency server.

18. The system as claimed in claim 17, wherein the bank account information comprises bank card number information and a mobile phone number bound to a bank card; the wallet application terminal communicates with the target operating agency server, and the target operating agency server verifies the user comprising:

the wallet application terminal receives bank card number information input by the user, and the wallet application terminal sends the bank card number information to the target operating agency server, so that the target operating agency server verifies the user on the basis of the bank card number information, and the wallet application terminal receives a verification result returned by the target operating agency server;

the wallet application terminal verifies, according to the bank card number information, whether a bank card input by the user is a bank card of an authorized authority;

the wallet application terminal receives a mobile phone number bound to a bank card input by the user, and the wallet application terminal sends to the target operating agency server a request for acquiring a verification code, so that the target operating agency server queries an issuer bank of the bank card for the verification code, and the wallet application terminal receives the verification code returned by the target operating agency server; and the wallet application terminal sends to the target operating agency server a request for verifying the verification code, so that the target operating agency server queries the issuer bank for the verification code, and the wallet application terminal receives a verification result returned by the target operating agency server.

19. The system as claimed in claim 10, the system further comprising:

the wallet application terminal receives a digital wallet identifier operation request of the user, and the wallet application terminal parses a digital wallet identifier from the digital wallet identifier operation request; and the wallet application terminal receives a payment password operation request from the user, and the wallet application terminal parses a payment password of digital wallet from the payment password operation request.

20. The system as claimed in claim 10, wherein after receiving the digital wallet opening result returned by the target operating agency server, the digital currency issuer agency server stores relevant information of an opened digital wallet, the relevant information comprising at least one of the following: a digital wallet name, a digital wallet ID and a bound mobile phone number.

\* \* \* \* \*